United States Patent
Salmini et al.

(10) Patent No.: US 10,350,851 B2
(45) Date of Patent: Jul. 16, 2019

(54) COMPOSITE ELEMENT FOR PROTECTION DEVICES OF PARTS OF THE HUMAN BODY

(71) Applicant: ANOMALY ACTION SPORTS S.R.L., Mestre (Venice) (IT)

(72) Inventors: Elena Salmini, Venice (IT); Carlo Salmini, Mestre (IT); Theodore Sharp Ligety, Park City, UT (US)

(73) Assignee: ANOMALY ACTION SPORTS S.R.L., Mestre (Venice) (IT)

( * ) Notice: Subject to any disclaimer, the term of this patent is extended or adjusted under 35 U.S.C. 154(b) by 317 days.

(21) Appl. No.: 14/907,140

(22) PCT Filed: Jul. 23, 2013

(86) PCT No.: PCT/IB2013/056035
§ 371 (c)(1),
(2) Date: Jan. 22, 2016

(87) PCT Pub. No.: WO2015/011524
PCT Pub. Date: Jan. 29, 2015

(65) Prior Publication Data
US 2016/0150835 A1    Jun. 2, 2016

(51) Int. Cl.
*B32B 3/24* (2006.01)
*B32B 7/022* (2019.01)
(Continued)

(52) U.S. Cl.
CPC ............ *B32B 3/266* (2013.01); *A41D 13/015* (2013.01); *A41D 13/08* (2013.01); *A42B 3/12* (2013.01);
(Continued)

(58) Field of Classification Search
None
See application file for complete search history.

(56) References Cited

U.S. PATENT DOCUMENTS 1,550,086 A * 8/1925 McManus ................. B27J 5/00
                                                              215/347
1,668,590 A * 5/1928 Hilfreich ................ B44C 3/025
                                                              264/247
(Continued)

FOREIGN PATENT DOCUMENTS

DE      2709546 A1 * 9/1978 ........... A43B 7/1425
DE     19601344 A1 * 8/1996 ............ A43B 17/14
(Continued)

OTHER PUBLICATIONS

Machine Translation of JP 62064527 A, Mar. 1987 (Year: 1987).*
Machine Translation of EP 1430814 A1, Jun. 2004 (Year: 2004).*
Machine Translation of EP 1645203 A1, Apr. 2006 (Year: 2006).*

*Primary Examiner* — Jeffrey A Vonch
(74) *Attorney, Agent, or Firm* — Tutunjian & Bitetto, P.C.

(57) ABSTRACT

A composite element for the realization of protection devices of parts of the human body includes a matrix, a reinforcing element, at least partially embedded in the matrix, wherein the reinforcing element has at least one opening shaped so as to define an undercut between the matrix and the reinforcing element, such undercut being suitable for determining a mechanical constraint between the matrix and the reinforcement element.

19 Claims, 2 Drawing Sheets

(51) Int. Cl.

| | | |
|---|---|---|
| *B32B 25/04* | (2006.01) | |
| *B32B 27/06* | (2006.01) | |
| *B29C 39/12* | (2006.01) | |
| *B29C 70/68* | (2006.01) | |
| *A41D 13/015* | (2006.01) | |
| *A41D 31/28* | (2019.01) | |
| *A42B 3/12* | (2006.01) | |
| *B32B 3/26* | (2006.01) | |
| *B32B 7/02* | (2019.01) | |
| *A41D 13/08* | (2006.01) | |
| *A63B 71/12* | (2006.01) | |
| *B32B 5/02* | (2006.01) | |
| *B32B 7/05* | (2019.01) | |
| *B32B 25/18* | (2006.01) | |
| *B32B 27/08* | (2006.01) | |
| *B32B 7/04* | (2019.01) | |
| *B29C 45/16* | (2006.01) | |
| *B29C 39/36* | (2006.01) | |
| *B29L 9/00* | (2006.01) | |
| *B29L 7/00* | (2006.01) | |
| *A41D 31/18* | (2019.01) | |
| *A41D 13/05* | (2006.01) | |
| *A42B 3/06* | (2006.01) | |
| *B29C 45/14* | (2006.01) | |
| *B29L 31/48* | (2006.01) | |
| *B29L 31/00* | (2006.01) | |
| *B29C 37/00* | (2006.01) | |
| *B32B 25/10* | (2006.01) | |
| *B32B 25/14* | (2006.01) | |
| *B32B 27/12* | (2006.01) | |
| *B32B 27/30* | (2006.01) | |
| *B32B 27/32* | (2006.01) | |
| *B32B 27/40* | (2006.01) | |
| *B29C 70/26* | (2006.01) | |

(52) U.S. Cl.
CPC ........ *A63B 71/1225* (2013.01); *B29C 39/123* (2013.01); *B29C 70/682* (2013.01); *B29C 70/688* (2013.01); *B32B 5/028* (2013.01); *B32B 7/02* (2013.01); *B32B 7/05* (2019.01); *A41D 13/0543* (2013.01); *A41D 31/185* (2019.02); *A41D 31/28* (2019.02); *A41D 31/285* (2019.02); *A41D 2500/00* (2013.01); *A41D 2600/10* (2013.01); *A42B 3/069* (2013.01); *A63B 2071/1258* (2013.01); *B29C 37/0082* (2013.01); *B29C 39/36* (2013.01); *B29C 45/14311* (2013.01); *B29C 45/14786* (2013.01); *B29C 45/1676* (2013.01); *B29C 70/26* (2013.01); *B29C 2045/14327* (2013.01); *B29C 2045/1681* (2013.01); *B29K 2995/0089* (2013.01); *B29L 2007/00* (2013.01); *B29L 2009/00* (2013.01); *B29L 2031/48* (2013.01); *B29L 2031/4821* (2013.01); *B29L 2031/721* (2013.01); *B29L 2031/768* (2013.01); *B32B 7/022* (2019.01); *B32B 7/04* (2013.01); *B32B 25/04* (2013.01); *B32B 25/042* (2013.01); *B32B 25/10* (2013.01); *B32B 25/14* (2013.01); *B32B 25/18* (2013.01); *B32B 27/06* (2013.01); *B32B 27/08* (2013.01); *B32B 27/12* (2013.01); *B32B 27/302* (2013.01); *B32B 27/306* (2013.01); *B32B 27/32* (2013.01); *B32B 27/40* (2013.01); *B32B 2250/02* (2013.01); *B32B 2250/24* (2013.01); *B32B 2250/246* (2013.01); *B32B 2262/0269* (2013.01); *B32B 2262/101* (2013.01); *B32B 2305/073* (2013.01); *B32B 2305/38* (2013.01); *B32B 2305/72* (2013.01); *B32B 2307/51* (2013.01); *B32B 2307/558* (2013.01); *B32B 2307/56* (2013.01); *B32B 2319/00* (2013.01); *B32B 2323/10* (2013.01); *B32B 2325/00* (2013.01); *B32B 2331/04* (2013.01); *B32B 2437/00* (2013.01); *B32B 2437/04* (2013.01); *B32B 2571/00* (2013.01); *Y10T 428/22* (2015.01); *Y10T 428/24157* (2015.01); *Y10T 428/24182* (2015.01); *Y10T 428/24298* (2015.01); *Y10T 428/24306* (2015.01); *Y10T 428/24339* (2015.01); *Y10T 428/24752* (2015.01); *Y10T 428/24942* (2015.01); *Y10T 428/24992* (2015.01)

(56) References Cited

U.S. PATENT DOCUMENTS

| | | | | |
|---|---|---|---|---|
| 2,428,977 A | * | 10/1947 | Mares | B29C 39/12 264/247 |
| 2,604,642 A | * | 7/1952 | Marco | A47C 27/144 5/655.9 |
| 2,622,052 A | * | 12/1952 | Chandler | A43B 3/0078 12/146 R |
| 2,651,079 A | * | 9/1953 | Michaelson | B29C 39/10 264/162 |
| 2,688,152 A | * | 9/1954 | Marco | B29C 44/334 264/255 |
| 2,837,455 A | * | 6/1958 | Wolf | A47C 27/22 264/273 |
| 2,844,833 A | * | 7/1958 | Odermatt | A43B 13/12 12/146 B |
| 2,885,797 A | * | 5/1959 | Chrencik | A43B 13/186 36/104 |
| 2,931,110 A | * | 4/1960 | Pietrocola | A43B 13/37 264/250 |
| 3,087,262 A | * | 4/1963 | Russell | A43B 13/181 36/28 |
| 3,877,076 A | * | 4/1975 | Summers | A42B 3/065 2/414 |
| 3,975,491 A | * | 8/1976 | Kramer | B02C 13/284 264/255 |
| 4,085,526 A | * | 4/1978 | Hemmer | A43B 13/26 36/59 R |
| 4,345,338 A | * | 8/1982 | Frieder, Jr. | A42C 2/007 2/414 |
| 4,627,114 A | * | 12/1986 | Mitchell | A42B 3/128 2/414 |
| 4,635,385 A | * | 1/1987 | Ogden | A43B 17/08 36/3 B |
| 4,667,423 A | * | 5/1987 | Autry | A43B 13/12 36/102 |
| 4,803,112 A | * | 2/1989 | Kakimoto | B32B 3/30 428/161 |
| 4,808,469 A | * | 2/1989 | Hiles | A42B 3/125 428/318.6 |
| 4,835,890 A | * | 6/1989 | Nelson | G09F 7/16 40/616 |
| 4,893,418 A | * | 1/1990 | Ogden | A43B 17/00 36/154 |
| 4,899,467 A | * | 2/1990 | Mackey | A43B 13/12 36/31 |
| 4,925,724 A | * | 5/1990 | Ogden | A43B 17/00 12/146 B |
| 5,025,573 A | * | 6/1991 | Giese | A43B 13/12 36/28 |
| 5,203,793 A | * | 4/1993 | Lyden | A43B 3/0063 12/142 N |
| 5,309,576 A | * | 5/1994 | Broersma | A42B 3/128 2/412 |
| 5,327,598 A | * | 7/1994 | Liou | A47C 9/025 5/652.1 |
| 5,367,791 A | * | 11/1994 | Gross | A43B 13/181 36/25 R |

(56) References Cited

U.S. PATENT DOCUMENTS

| | | | | |
|---|---|---|---|---|
| 5,669,079 | A | * | 9/1997 | Morgan .................. A42B 3/128 2/412 |
| 5,709,954 | A | * | 1/1998 | Lyden ...................... A43B 5/00 12/142 R |
| 5,933,982 | A | * | 8/1999 | Chen ...................... A43B 13/18 36/28 |
| 5,950,244 | A | * | 9/1999 | Fournier ................ A42B 3/128 2/411 |
| 6,490,730 | B1 | * | 12/2002 | Lyden ................ A41D 13/0153 2/22 |
| 8,990,985 | B1 | * | 3/2015 | Wilhelm .................. A47C 7/20 5/653 |
| 2002/0035796 | A1 | | 3/2002 | Knoche ................ A43B 1/0009 36/59 R |
| 2002/0116843 | A1 | * | 8/2002 | Harrison .................. A43B 1/00 36/84 |
| 2004/0168246 | A1 | * | 9/2004 | Phillips .................. A42B 3/064 2/411 |
| 2005/0150134 | A1 | * | 7/2005 | Issler ................... A43B 13/141 36/102 |
| 2006/0075693 | A1 | * | 4/2006 | Tsunoda ................ A42B 3/065 52/80.1 |
| 2006/0156579 | A1 | * | 7/2006 | Hoffer .................. A43B 1/0009 36/28 |
| 2007/0000032 | A1 | * | 1/2007 | Morgan .................. A42B 3/124 2/412 |
| 2007/0209120 | A1 | * | 9/2007 | Clark ..................... A47C 27/15 5/729 |
| 2008/0095983 | A1 | * | 4/2008 | Callsen ................ A47C 27/085 428/141 |
| 2008/0115389 | A1 | * | 5/2008 | Hsieh .................. A43B 13/181 36/30 A |
| 2008/0268191 | A1 | * | 10/2008 | Liao ........................ B32B 3/266 428/35.7 |
| 2008/0271340 | A1 | * | 11/2008 | Grisoni .................. A43B 7/142 36/43 |
| 2008/0292851 | A1 | * | 11/2008 | Egerer .................... B29C 43/18 428/196 |
| 2009/0081407 | A1 | * | 3/2009 | Giraud ................ B29C 37/0082 428/98 |
| 2010/0129573 | A1 | * | 5/2010 | Kim ........................ B32B 3/10 428/34.1 |
| 2010/0237082 | A1 | * | 9/2010 | Fernandez ............. A47C 7/021 220/592.17 |
| 2010/0264571 | A1 | * | 10/2010 | Tarazona De La Asuncion ......... A42B 3/128 267/141 |
| 2011/0064911 | A1 | * | 3/2011 | Kuo ..................... A43B 1/0009 428/131 |
| 2012/0076981 | A1 | * | 3/2012 | Franks ..................... A63B 6/00 428/138 |
| 2012/0167308 | A1 | * | 7/2012 | Van Lear ............. A47C 27/085 5/655.5 |
| 2012/0216327 | A1 | * | 8/2012 | Turner ............... A41D 13/0156 2/69 |
| 2013/0025036 | A1 | * | 1/2013 | Turner .................. A42B 3/125 2/455 |
| 2013/0142984 | A1 | * | 6/2013 | Kuo .......................... B32B 3/12 428/72 |
| 2014/0068840 | A1 | * | 3/2014 | Nauman ................ A42B 3/128 2/411 |
| 2014/0182170 | A1 | * | 7/2014 | Wawrousek ............. A43B 7/14 36/103 |
| 2014/0196998 | A1 | * | 7/2014 | Nauman ................ C08L 83/04 188/377 |
| 2014/0223777 | A1 | * | 8/2014 | Whiteman ........... A43B 13/125 36/102 |
| 2014/0223783 | A1 | * | 8/2014 | Wardlaw ............. A43B 1/0009 36/114 |
| 2014/0259322 | A1 | * | 9/2014 | Henry .................... A63B 71/12 2/455 |
| 2014/0305439 | A1 | * | 10/2014 | Chodkowski ..... A61M 16/0683 128/207.11 |

FOREIGN PATENT DOCUMENTS

| | | | | |
|---|---|---|---|---|
| EP | 0096763 | A2 | * 12/1983 | ............ A42B 3/064 |
| EP | 0130816 | A2 | * 1/1985 | ............ A43B 13/16 |
| EP | 0608097 | A2 | * 7/1994 | ............ B32B 7/04 |
| EP | 1430814 | A1 | * 6/2004 | ........... A47C 27/144 |
| EP | 1645203 | A1 | * 4/2006 | ............ A43B 7/141 |
| EP | 2653048 | A1 | * 10/2013 | ............ A43B 3/26 |
| FR | 1218101 | A | * 5/1960 | ............ A43B 13/12 |
| FR | 2521065 | A1 | * 8/1983 | ............ B29C 48/30 |
| FR | 2863458 | A1 | * 6/2005 | ........... A43B 1/0027 |
| GB | 127536 | A | * 6/1919 | ............... D06N 1/00 |
| JP | 62064302 | A | * 3/1987 | |
| JP | 62064527 | A | * 3/1987 | |
| JP | 03193539 | A | * 8/1991 | |
| JP | 03193540 | A | * 8/1991 | |
| JP | 03193544 | A | * 8/1991 | ............ A43B 13/16 |
| JP | 04024001 | A | * 1/1992 | |
| JP | 04089002 | A | * 3/1992 | |
| JP | 2002238707 | A | * 8/2002 | |
| WO | WO-2009152795 | A1 | * 12/2009 | ............ A42B 3/124 |
| WO | WO-2011132902 | A2 | * 10/2011 | ............ A43B 7/146 |

* cited by examiner

COMPOSITE ELEMENT FOR PROTECTION DEVICES OF PARTS OF THE HUMAN BODY

TECHNICAL FIELD OF THE INVENTION

The present invention relates to a composite element for protection devices of parts of the human body.

In particular, the present invention relates to a composite element for the realisation of padding for protection devices of parts of the human body, characterized by a high ability to absorb impacts and to dissipate the impact energy transmitted to the human body.

STATE OF THE ART

With reference to protection devices used in sports or leisure activities in general, such as helmets, back protectors, shin guards or similar devices designed to protect human body parts from impacts or trauma, it is known the use of composite structures including absorbing element equipped with one or more reinforcing elements.

The absorbing element is provided to reduce the impact energy that is transmitted to the user body in order to avoid trauma such as bruises, contusions, fractures or similar.

Generally, the absorbing element is made of lightweight material, such as expanded polystyrene, polypropylene, polyurethane, and other lightweight polymers and elastomers in order to avoid encumbering of a user and to ensure a discrete comfort.

The reinforcing element can be placed inside the absorbing element, in specifically identified areas of the protection device, according to the level of shock that such areas may take in case of an impact.

The use of a mesh type reinforcing element completely embedded inside the absorbing element is known.

Such mesh type reinforcing element is suitable to ensure a distributed reinforcement throughout the absorbing element itself.

According to the features of the weft, the reinforcing mesh element allows to distribute the impact energy on a wide area of the absorbing element and therefore to reduce the effects of an impact on the body of a user wearing such protection device.

Moreover, the reinforcing mesh element increases the resistance of the absorbing element against the penetration of objects impacting against the absorbing element itself.

The mesh, which is made of high resistance fibers such as Kevlar, glass fibers or the like, is more rigid and resistant than the absorbing element, in which it is embedded, that is made of polyester foam.

Following an impact or of the penetration of an object, the reinforcing mesh element can damage the absorbing element, lacerating the latter, thus reducing the dampening feature of the protection device.

Although the mesh element acts as a barrier against the penetration of an object, it does not allow to uniformly dissipate the energy of an impact along the absorbing element.

The mesh element, indeed, tends to tear the absorbing element at the connection interface with the latter, thus causing the formation of discontinuities that do not allow to properly distribute the stresses induced by an impact.

As the absorbing element is lacerated by the reinforcing mesh element, it is no longer able to plastically deform and therefore to dissipate the impact energy.

Therefore, it is felt the need to improve the performance of the elements constituting the absorbing element of the devices for the protection of the parts of the human body with particular reference to the feature of absorbing and reducing the effects of an impact. Furthermore, it is felt the need to provide an element, for protection devices, which ensures a high resistance to penetration of objects both small and large, and that presents a weight content to ensure a good comfort to the user.

SUMMARY OF THE INVENTION

The technical aim of the present invention is therefore to improve the state of the art.

Within such technical aim, a purpose of the present invention is developing a composite element for protection devices of the human body characterized by high impact energy absorption performances, comprising a reinforcement suitable to effectively increase the efficiency of the shock energy absorption of an impact absorbing element.

Another purpose of the present invention is developing a composite element for protection devices of parts of the human body, foreseen for sports use, which is lightweight in order not to reduce the comfort of a user wearing a protective device comprising a composite element according to the present invention.

Another purpose of the present invention is developing a composite element for protection devices of parts of the human body characterized by a high resistance against objects penetration.

This aim and these purposes are achieved by the composite element for protection devices of parts of the human body according to the present specification.

Another purpose of the present invention is developing a method for the realization of a composite element for protection devices of parts of the human body, within an economic solution.

These purposes are achieved by the method for the realisation of a composite element for protection devices of parts of the human body according to the present principles. The present specification relates to preferred and advantageous embodiments of the invention.

BRIEF DESCRIPTION OF THE DRAWINGS

These and other advantages will be better understood by any man skilled in the art from the description that follows and from the attached drawings, given as a non-limiting example, in which.

DETAILED DESCRIPTION

Figure 1:
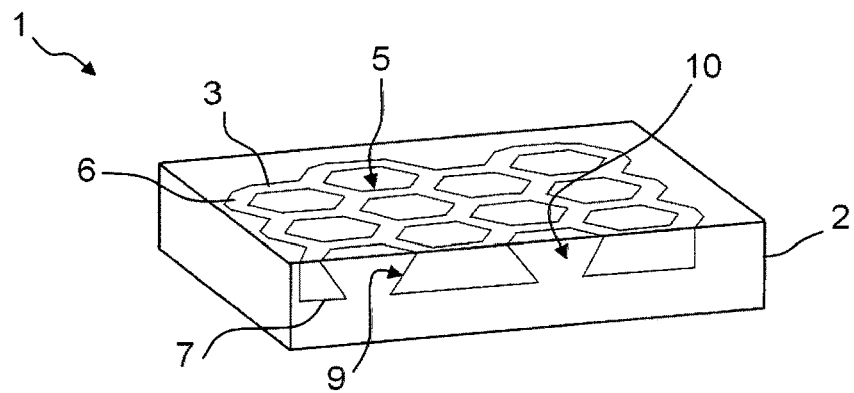
FIG. 1 is a perspective view of a composite element for protection devices of parts of the human body according to the present invention.

With reference to the attached figure, a composite element for protection devices of parts of the human body is wholly indicated with 1.

The composite element 1 is provided for the realization of the inner portion—shock absorbing element—of a device for the protection of the human body parts, such as a helmet, a back protector, a shin protector, a forearm protector or similar devices to be used in sport activities. In particular, the composite element 1 can be associated to an outer shell, not shown in the figures, constituting the outer shell of a helmet or in general the outermost portion of a device for the protection of the human body.

The composite element 1 comprises a matrix 2 and a reinforcing element 3.

The reinforcing element 3 is at least partially embedded in the matrix 2.

The matrix 2 is made with a material selected from the group comprising expanded Polystyrene, Polypropylene, Polyurethane, Ethylene-vinyl acetate (EVA), NBR rubber and other lightweight polymers, elastomers, viscoelastic and viscoplastic polymers or similar materials.

With reference to the embodiment illustrated in the figures, the reinforcing element 3 is partially embedded and positioned at the inner portion 4 of the matrix 2.

With reference to the matrix 2, the expression "inner portion" refers to the portion of the matrix 2 that in use is placed in proximity or in direct contact with the body of a user.

With reference to the matrix 2, the expression "external portion" refers to the portion of the matrix 2 that in use faces externally with respect to the portion of the human body to which the composite element 1 is applied. According to a further version of the present invention, not shown in the figures, the reinforcing element 3 is at least partially embedded in correspondence of the external portion of the matrix 2.

Still, according to a further version of the present invention, not shown in the figures, the reinforcing element 3 is wholly embedded in the central portion or in the inner portion or in the outer portion of the matrix 2.

The reinforcing element 3 has a substantially flat-type crosslinked structure, showing a top surface 6 and a bottom surface 7.

According to the relative position of the reinforcing element 3 respect to the matrix 2

With reference to the embodiment illustrated in the attached figures, by way of a non-limiting example, the reinforcing element 3 has at least one opening 5.

According to a version of the present invention, the opening 5 is of the through type.

Figure 2:
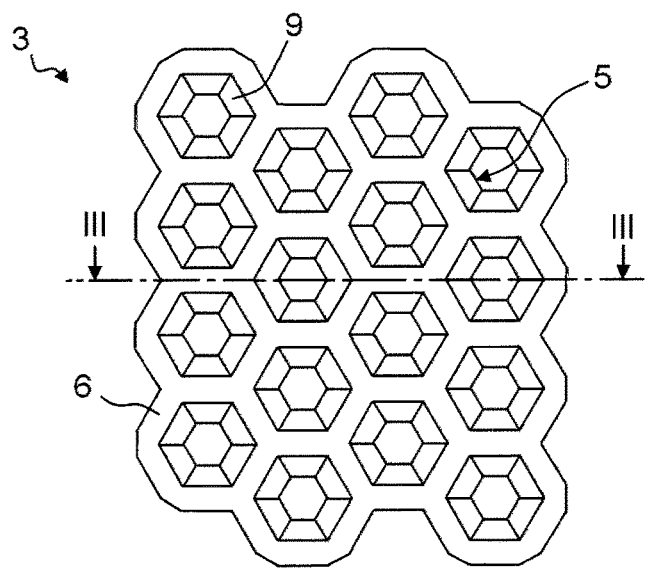
FIG. 2 is a top view of a possible reinforcing element of the composite element according to FIG. 1.

With reference to the structure of the reinforcing element 3 shown in FIG. 2, the latter is provided with a plurality of hexagonal through openings 5.

However, further shapes of the at least one opening 5, not shown in the figures, comprising at least one opening of circular and/or elliptical and/or square and/or any polygonal shape without departing from the scope of protection of the present invention are possible.

Figure 3:
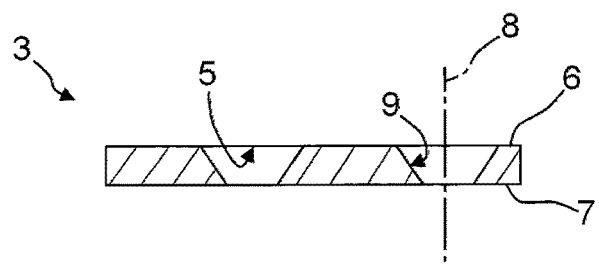
FIG. 3 is a section view of the reinforcing element of FIG. 2, along the plane III-III.
Figure 4:
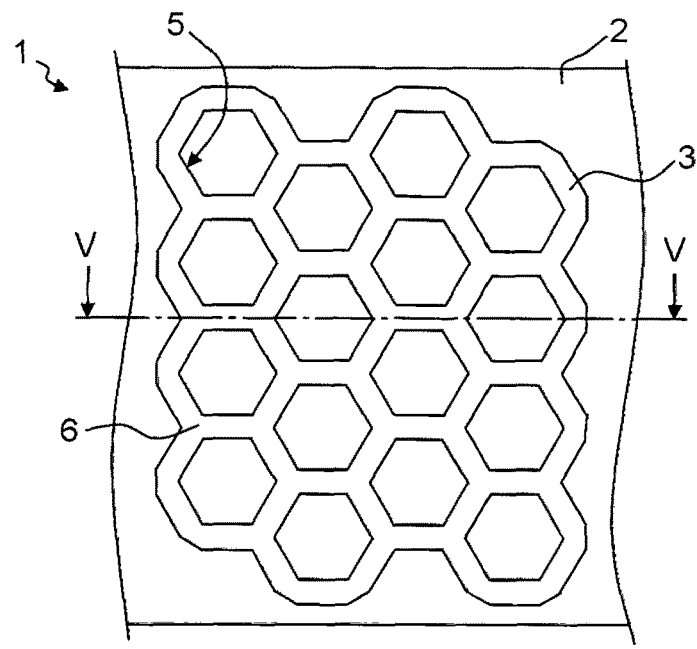
FIG. 4 is a top view of the composite element according to FIG. 1.
Figure 5:
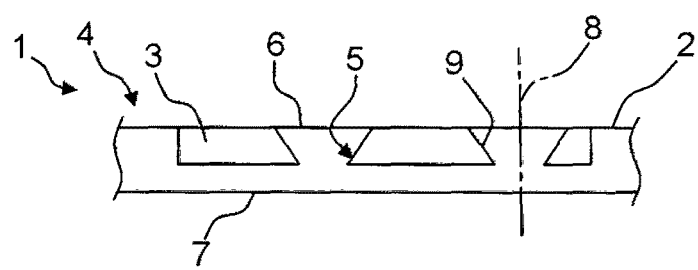
FIG. 5 is a section view of the composite element according to FIG. 4, along the plane V-V.

With reference to the sectional view of the reinforcing element 3 shown in FIG. 3, the at least one opening 5 presents a substantially frusto-conical section.

In particular, the at least one opening 5 at the bottom surface 7 of the reinforcing element 3 has a section narrower than that at the top surface 6.

When the reinforcing element 3 is partially embedded at the inner portion or at the outer portion of the matrix 2, the top surface 6 of the reinforcing element 3 is preferably provided facing towards the inner portion or at the outer portion of the matrix 2.

The at least one opening 5 is complementary to the matrix 2 and vice versa.

The frusto-conical configuration of the at least one opening 5 ensures high performance of the composite element 1, with particular reference to the resistance against objects penetration.

Furthermore, the particular shape of the reinforcement element 3 ensures a high ability to distribute the stresses induced by an impact within the matrix 2, as better described hereinafter.

The at least one opening 5 presents a substantially vertical axis 8.

The vertical axis 8 defines a direction with respect to which the side walls 9 of the at least one opening 5 are inclined.

If the at least one opening 5 presents, in plan view, a substantially circular shape, the inclination of the side wall 9 confers a truncated-cone shape to the inner section of the at least one opening 5.

According to another version, not shown in the figures, the at least one opening 5 can present a quadrangular shape, in plan view.

Therefore, the inclination of the side walls 9 with respect to the axis 8 confers to the inner section of the at least one opening 5 a truncated pyramid shape.

The configuration of the at least one opening 5 determines an undercut 10 between the matrix 2 and the reinforcing element 3.

This undercut 10 determines, in turn, a mechanical constraint between the matrix 2 and the reinforcing element 3, preventing the latter to detach from the matrix 2 itself in steady state or following an impact.

The reinforcing element 3 is made of an elastic material capable of deforming under the action of an external traction or compression force, and to return to its original shape when the force is no longer applied.

According to a further version of the present invention, the reinforcing element 3 is plastically deformable.

The reinforcing element 3 is selected from the group comprising Ethylene-vinyl acetate (EVA), NBR rubber, Polyurethane, Polystyrene, Polypropylene, and other lightweight viscoelastic or viscoplastic polymers and elastomers or similar materials.

According to a version of the present invention, unlike the reinforcing mesh element used in the known art previously described, the reinforcing element 3 is elastically deformable along any direction.

Thanks to its elasticity, the reinforcing element 3 can be easily conformed to adapt it to the various geometries of the protection devices of parts of the human body that are to be produced.

The reinforcing element 3 presents a substantially crosslinked structure that allows to transmit the stress of an impact occurring on a restricted area of the composite element 1 and to transmit it to a larger area within the matrix 2.

In this way, since the impact energy is dissipated on a larger area within the matrix 2, the stress transmitted to the body of a user is effectively reduced, thus increasing the efficiency of protection device itself.

The matrix 2 is made with a thermoplastic or thermoset type material that in the initial stage is of liquid or foam nature, or in pre-expanded beads with surface that bond with each other at higher temperatures.

The matrix 2, for example, can be co-injected into a mold in which the reinforcing element 3 has been previously placed.

The matrix 2 has a stiffness greater than that of the reinforcing element 3.

An interface between the matrix 2 and the reinforcing element 3 is determined, at which bonds of chemical, physical and mechanical type are established.

The chemical and physical bonds determine high cohesion between the matrix 2 and the reinforcing element 3, thus allowing between the components constituting the composite element 1 the effectively transmission and dissipation of the energy that is released during an impact.

The matrix 2 and the reinforcing element 3 may belong to the same or to different group of materials.

The chemical and physical bonds that are established at the interface between the matrix 2 and the reinforcing element 3 determine a continuity of the composite material 1, avoiding the presence of voids or defects that may reduce the ability of the composite material 1 to effectively dissipate the collision energy.

The mechanical bonds between the matrix 2 and the reinforcing element 3 are due to the at least one undercut 10 at the at least one opening 5.

The at least one undercut 10 ensures a high cohesion between the matrix 2 and the reinforcing element 3 itself, that are complementary one to each other, increasing the effect of adhesion of the chemical and physical bonds.

Figure 6:
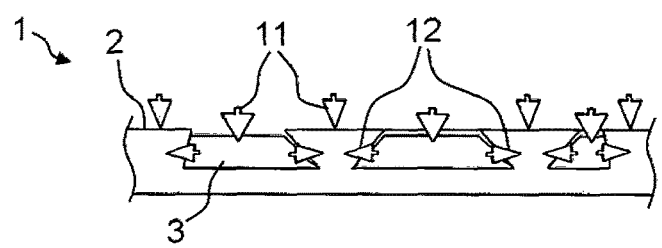
FIG. 6 is a schematic view of a possible deformation of the composite element according to the present invention in case of a collision.

With reference to the embodiment illustrated in FIG. 6, as a result of an external impact acting against the composite element 1, both the matrix 2 and the reinforcing element 3 are subject to compressive stress, indicated by the vertical arrows 11.

The reinforcing element 3 during the compression phase is compressed along the vertical direction and simultaneously widens in the horizontal direction as shown by the horizontal arrows 12.

The matrix 2 hinders the horizontal deformation of the reinforcing element 3 at the undercut 10.

The reinforcing element 3 during an impact undergoes an elastic deformation, while the matrix 2 undergoes a plastic type deformation due to the action of the external impact force and by the action of the reinforcing element 3 at the undercut 10.

However, a composite element 1 comprising a matrix 2 and a reinforcing element 3 made with materials with similar elastic, plastic and viscoelastic properties but of different stiffness and/or density that will provide different interface behaviors is possible.

Due to the different behavior of the materials constituting the matrix 2 and the reinforcing element 3 it may happen that the physical and chemical bonds at the interface between these components may be altered.

However, the presence of a least one undercut 10 ensures a high compactness and mechanical cohesion between the matrix 2 and the reinforcing element 3, also in the case in which the chemical and/or physical bonds are weakened or broken.

The reinforcing element 3, indeed, is elastically flexible and able to distribute the energy of an impact over a large interface of the matrix 2.

The increase of plastic deformation of the matrix 2 induced by the horizontal elastic deformation of the reinforcing element 3 increases both surface and volume impact energy absorption efficiency of the matrix 2.

By the elastic behavior, the reinforcing element 3 does not cause concentrated efforts that may damage the matrix 2 reducing its integrity and, therefore, the ability to isolate the portion of the human body against which the protection device is placed.

Regardless of the fact that an impact insists on a concentrated area or a wide area of a composite element 1, the reinforcing element 3 allows to effectively dissipate the energy of the impact, distributing the same in an efficiently manner within the matrix 2, thus overcoming the drawbacks of the known art.

According to another version of the present invention, the matrix 2 can be elastically, viscoelastically or viscoplastically deformable, while the reinforcing element 3 can be plastically deformable.

According to a further version of the present invention, both the matrix 2 and the reinforcing element 3 are elastically or viscoelastically or viscoplastically deformable.

According to a further version of the present invention, both the matrix 2 and the reinforcing element 3 are plastically deformable.

The composite element 1, according to the present invention, allows to effectively dissipate the energy that is transmitted to the parts of the human body during an impact.

The reinforcing element 3 and the matrix 2 are lightweight and therefore they do not contribute to significantly increase the weight of the composite element 1, thereby allowing the body weight content of a protection device of parts of human.

Thus a protection device made up with the composite element 1 is lightweight and comfortable to wear.

The reinforcing element 3 may be partially or fully embedded within the matrix 2, at its inner portion 4 that, during the use, it is foreseen to be placed in direct or indirect contact with the portion of the human body to be protected, and/or at central portion and/or at external portion that in use it is not in contact with the portion of the human body to protect.

The present invention also relates to a method for the realisation of composite element 1 for protection devices of parts of the human body, to be used during sports and/or leisure activities.

The method, according to the present invention, involves the realisation of a composite element 1 with high performance, high impact energy absorption and resistance against the penetration of objects, through a process of co-molding, within an economic solution.

The method comprises the following steps:
providing at least one mold;
providing within the mold a reinforcing element (3) comprising at least one opening (5);
introducing a material forming the matrix (2) inside the mold;
at least partially embed the reinforcing element (3) in the matrix (2), determining at least one undercut (10) between the reinforcing element (3) and the matrix (2) in correspondence of the at least one opening (5).

The material of the matrix 2 can be initially of liquid or foam state, or in a form of pre-expanded beads.

According to one version of the present invention, the matrix 2 is co-molded together with the reinforcing element 3 inside a same mold.

After the co-molding step it is expected until the complete solidification of the matrix 2 occurs.

After the solidification of the matrix 2, the mold can be opened and the composite element 1 thus obtained can be removed.

The features of the composite element 1 may be modified varying the position of the reinforcing element 3 with respect to the matrix 2, i.e. by placing the reinforcing element 3 in correspondence of the outer, inner or middle portion of the matrix 2.

Moreover, it is possible to use reinforcing elements 3 comprising at least two openings 5, each one provided with a different shape and size from each other, in order to vary the deformability and the mechanical behavior of the reinforcing element 3 itself.

In the case that the composite element 1 is realized through a co-molding process, it is possible to use co-molding molds of the traditional type, thus reducing the costs of production of the composite element 1, as it is not required the fitting of new molds.

The present invention has been described according to preferred embodiments, but equivalent variants can be devised without departing from the scope of protection offered by the following claims.

The invention claimed is:

1. A composite element for the protection of parts of the human body by the absorption and dissipation of impact energy, comprising:
   a matrix, the matrix comprising a thickness defined between an outer surface of an inner portion of the matrix and an outer surface of an outer portion of the matrix; and
   a reinforcing element, the reinforcing element comprising a thickness defined between a top surface and bottom surface of the reinforcing element, and the reinforcing element comprises a mesh-type structure of a plurality of through openings distributed throughout in a substantially regular array, wherein the mesh-type structure is defined at the top surface,
      wherein each of the openings is defined by sidewalls inclined with respect to a vertical axis of each of the openings so that the sidewalls of each opening form a truncated conical or pyramidal shape in cross-section, wherein a narrow end of the truncated conical or pyramidal shape is at the bottom surface, and
      wherein the reinforcing element is partially embedded at an inner portion of the matrix, wherein the thickness of the reinforcing element is less than the thickness of the matrix, such that the matrix covers the bottom surface of the reinforcing element, and extends into each of the openings from the bottom surface, wherein the truncated conical or pyramidal shape of the openings defines an undercut providing a mechanical constraint between the matrix and the reinforcing element, and the top surface of the reinforcing element is substantially flush with the outer surface of the inner portion of the matrix.

2. The composite element according to claim 1, wherein during an impact, the reinforcing element is compressed along the vertical direction and simultaneously widens in the horizontal direction, wherein the matrix hinders the horizontal deformation of the reinforcing element at the undercut.

3. The composite element according to claim 1, wherein the mechanical constraint provided by the undercut prevents the reinforcing element from detaching from the matrix following an impact.

4. The composite element according to claim 3, wherein an interface between the matrix and the reinforcing element additionally comprises chemical and/or physical bonds, wherein the mechanical constraint provided by the undercut ensures mechanical cohesion when the chemical and/or physical bonds are weakened or broken.

5. The composite element according to claim 1, wherein said composite element has a laminar shape.

6. The composite element according to claim 1, wherein each of the openings is circular, elliptical, or polygonal in a plan view.

7. The composite element according to claim 1, wherein the vertical axis is perpendicular to the top surface of the reinforcing element.

8. The composite element according to claim 1, wherein at least two openings have a different shape and/or dimensions from each other.

9. The composite element according to claim 1, wherein the reinforcing element is elastically deformable and is selected from the group comprising ethylene-vinyl acetate (EVA), polyurethane, NBR rubber, and other viscoelastic and viscoplastic polymers.

10. The composite element according to claim 1, wherein the matrix is plastically deformable and is selected from the group comprising polystyrene and polypropylene.

11. The composite element according to claim 1, wherein the matrix is viscoelastically or viscoplastically deformable and is selected from the group comprising ethylene-vinyl acetate (EVA), polyurethane, NBR rubber, and other viscoelastic and viscoplastic polymers.

12. The composite element according to claim 1, wherein the matrix has a stiffness greater than that of the reinforcing element.

13. The composite element according to claim 1, wherein the reinforcing element is plastically deformable and is selected from the group comprising polystyrene and polypropylene.

14. The composite element according to claim 1, wherein the reinforcing element and the matrix comprise materials with similar elastic, plastic, and viscoelastic properties, but differ in at least one of mechanical stiffness or density.

15. The composite element according to claim 1, wherein the reinforcing element is placed during use in contact with a human body part.

16. The composite element according to claim 1, wherein the composite element comprises a part of a helmet, a back protector, a shin protector, a forearm protector, or a similar protection device to be used in sport activities.

17. A method of making the composite element according to claim 1, comprising the steps of:
   providing at least one mold;
   providing inside the at least one mold the reinforcing element; and
   introducing a material constituting the matrix inside the mold partially embedding the reinforcing element in the inner portion of the matrix.

18. The method according to claim 17, further comprising the step of further providing between the matrix and the reinforcing element bonds of chemical and physical type.

19. The method according to claim 17, further comprising the step of removing the composite element from the mold following the solidification of the material constituting the matrix.

* * * * *